(12) United States Patent
Matsumoto

(10) Patent No.: US 8,692,714 B2
(45) Date of Patent: Apr. 8, 2014

(54) GNSS RECEIVER

(75) Inventor: Masatoshi Matsumoto, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 180 days.

(21) Appl. No.: 13/138,498

(22) PCT Filed: Feb. 26, 2010

(86) PCT No.: PCT/JP2010/053162
§ 371 (c)(1),
(2), (4) Date: Aug. 26, 2011

(87) PCT Pub. No.: WO2010/098468
PCT Pub. Date: Sep. 2, 2010

(65) Prior Publication Data
US 2011/0309978 A1 Dec. 22, 2011

(30) Foreign Application Priority Data
Feb. 27, 2009 (JP) ................................. 2009-046447

(51) Int. Cl.
*G01S 19/37* (2010.01)
*G01S 19/31* (2010.01)

(52) U.S. Cl.
USPC ................................. 342/357.77; 342/357.71

(58) Field of Classification Search
USPC ............. 342/357.46, 357.65, 357.71, 357.77; 701/467, 468
See application file for complete search history.

(56) References Cited

U.S. PATENT DOCUMENTS 5,663,733 A * 9/1997 Lennen .................... 342/357.69
6,313,789 B1 * 11/2001 Zhodzishsky et al. ... 342/357.68
2008/0031390 A1 * 2/2008 Ban et al. .................... 375/347
2008/0069187 A1 3/2008 Chen et al.

FOREIGN PATENT DOCUMENTS

| EP | 1 681 773 A1 | 7/2006 |
|---|---|---|
| FR | 2 902 949 A1 | 12/2007 |
| JP | 2007-256041 | 10/2007 |
| JP | 2008-249427 | 10/2008 |
| WO | WO 2007/147807 A1 | 12/2007 |

OTHER PUBLICATIONS

Julien, Olivier et al., Two for One, Tracking Galileo CBOC Signal with TMBOC, Inside GNSS, Spring 2007, vol. 2, No. 3, pp. 50-57.
Supplementary European Search Report for Application No. 10 74 6347.3, dated Aug. 22, 2013.

* cited by examiner

*Primary Examiner* — Dao Phan
(74) *Attorney, Agent, or Firm* — Birch, Stewart Kolasch & Birch, LLP

(57) ABSTRACT

To realize a GNSS receiver that can perform further optimal correlation processing on a positioning signal phase-modulated by a CBOC signal. A correlation processing module 32 performs correlation processing between a baseband signal and a BOC(1, 1) replica code to output a BOC(1, 1) correlation data, and also performs correlation processing between the baseband signal and a BOC(6, 1) replica code to output a BOC(6, 1) correlation data. A synthesis module 33 uses a BOC(1, 1) synthesizing ratio coefficient $G_{11}$ and a BOC(6, 1) synthesizing ratio coefficient $G_{61}$ to synthesize the BOC(1, 1) correlation data with the BOC(6, 1) correlation data, and outputs the synthesized correlation data to a calculation module 30. The calculation module 30 detects a reception environment based on the synthesized correlation data, sets a BOC(1, 1) synthesizing ratio coefficient and a BOC(6, 1) synthesizing ratio coefficient based on the reception environment, and supplies them to the synthesis module 33.

6 Claims, 7 Drawing Sheets

GNSS RECEIVER

TECHNICAL FIELD

The present invention relates to a GNSS receiver for being used in positioning by demodulating a positioning signal that is phase modulated by a predetermined spreading code.

BACKGROUND ART

Currently, various kinds of systems for performing a communication by phase-modulating an information transmission signal by using a spreading code are put in practical use. As one of systems using such a communication method, there is a GNSS. For example, in the GPS that is implemented by U.S.A, it is used for positioning and the like by transceiving an L1 signal and an L2 signal formed by phase modulating with a PN code (C/A code or P code), an L1 carrier wave and an L2 carrier wave superimposed with a navigation message.

As one of systems of such a GNSS, there is the Galileo that is expected to be implemented by Europe. In the Galileo, as disclosed in Nonpatent Document 1, a CBOC signal is used. The CBOC signal is, upon using a carrier wave same as the GPS and a PN code different from the GPS, a signal of which the PN code is further modulated by a synthesized subcarrier constituted by synthesizing a BOC(1, 1) subcarrier with a BOC(6, 1) subcarrier by a particular synthesizing ratio. Specifically, the particular synthesizing ratio is BOC(1, 1):BOC(6, 1)=$10^{(1/2)}$:1 in electric power ratio.

Note that, due to a code of BOC(6, 1) at the time of synthesizing, a CBOC. in-phase signal (E1B signal) and a CBOC. anti-phase signal (E1C signal) exist. In the following explanation, the CBOC. in-phase signal is simplified as the "CBOC+ signal" and the CBOC. anti-phase signal is simplified as the "CBOC− signal." Further, when referring to the same thing for both of the CBOC+ signal and the CBOC− signal, they are simply referred to as the "CBOC signal."

Further, a receiver of the Galileo generates a replica code based on a PN code and a subcarrier that are used on a transmission side, and demodulates the replica code by performing correlation processing of the to replica code and a received signal to perform a code tracking. For example, in the receiver for the Galileo, a CBOC replica code constituted by synthesizing the BOC(1, 1) subcarrier with the BOC(6, 1) subcarrier at a synthesizing ratio according to its use is used for the correlation processing.

REFERENCE DOCUMENT(S) OF CONVENTIONAL ART

Nonpatent Document

Nonpatent Document 1: "Inside GNSS", Gibbons Media and Research, LLC, Spring 2007, p. 50-57

DISCLOSURE OF THE INVENTION

Problem(s) to be Solved by the Invention

Here, if the synthesizing ratio of the subcarrier that is used when generating the replica code is changed, a multipath property may change, or a pseudorange error and a correlation level according to a C/No of the received signal may change.

FIG. 1 is charts showing a RAME (Running Average Multipath Error) that is an evaluation result of the multipath property corresponding to the synthesizing ratio of the BOC (1, 1) subcarrier and the BOC(6, 1) subcarrier. It can be said that a multipath tolerance becomes high as a value of this RAME becomes small. FIG. 1(A) is the RAME of the CBOC+ signal and FIG. 1(B) is the RAME of the CBOC− signal. Note that, in FIG. 1(A), the "CBOC+/CBOC+" indicates that the correlation processing is performed, with respect to the CBOC+ signal, with the CBOC+ replica code constituted with a synthesizing ratio (BOC(1, 1):BOC(6, 1)=$10^{(1/2)}$:1), which corresponds to the use. The "CBOC+/BOC(1, 1)" and the "CBOC+/BOC(6, 1)" indicate that the correlation processing is performed, with respect to the CBOC+ signal, with a replica code generated only by the BOC(1, 1) subcarrier (hereinafter, it may be referred to as the BOC(1, 1) replica code) or a replica code generated only by the BOC(6, 1) subcarrier (hereinafter, it may be referred to as the BOC(6, 1) replica code), the "CBOC+/CBOC+(a:b)" indicates that the correlation processing is performed, with respect to the CBOC+ signal, with the CBOC+ replica code constituted by synthesizing the BOC(1, 1) subcarrier with the BOC(6, 1) subcarrier with a synthesizing ratio of a:b. Further, the similar conditions defined in the FIG. 1(A) are indicated for the CBOC− signal in FIG. 1(B).

As shown in FIG. 1, in the case where the correlation processing is performed on the CBOS signal with the replica code obtained by synthesizing the BOC(1, 1) subcarrier with the BOC(6, 1) subcarrier, the correlation processing with the CBOC replica code constituted with the synthesizing ratio which corresponds to the use tends to more easily receive an influence of a multipath and has a large pseudorange error compared to the case where the correlation processing is performed with a replica code with a high synthesizing ratio of the BOC(6, 1) subcarrier.

Next, FIG. 2 is charts showing a change of a pseudorange standard deviation according to the synthesizing ratio of the BOC(1, 1) subcarrier and the BOC(6, 1) subcarrier in the replica code and the C/No. FIG. 2(A) is the pseudorange standard deviation of the CBOC+ signal and FIG. 2(B) is the pseudorange standard deviation of the CBOC− signal.

As shown in FIG. 2, in the case where the C/No is changed and the synthesizing ratio of the BOC(1, 1) subcarrier and the BOC(6, 1) subcarrier is changed, only when the synthesizing ratio of the BOC(1, 1) subcarrier and the BOC(6, 1) subcarrier is 1:1, the pseudorange standard deviation degrades by about 0.1 m compared to other synthesizing ratios, and a difference of only 0.1 m or less occurs among the other synthesizing ratios. Therefore, an accuracy of the pseudorange hardly differs due to the synthesizing ratio.

Here, when the correlation processing of the CBOC signal is performed with the CBOC replica code constituted with the synthesizing ratio which corresponds to the use, the correlation level becomes higher compared to when the correlation processing is performed with the replica code with a high synthesizing ratio of the BOC(6, 1) subcarrier.

However, when the correlation processing is performed with the CBOC replica code, as described above, although the correlation level is high, it more easily receives the influence of the multipath. As a result, there has been a possibility that the pseudorange error becomes large and a positioning accuracy degrades.

Therefore, an object of the present invention is to achieve a GNSS receiver that can perform a correlation processing on a positioning signal using a PN code that is phase modulated by a plurality of subcarriers, such as a CBOC signal, so that a multipath property and a pseudorange accuracy are improved while obtaining an appropriate correlation level.

Means for Solving the Problems

This invention relates to a GNSS receiver for receiving and code tracking a positioning signal that is phase modulated by a spreading code. The GNSS receiver includes a replica code generating module, a correlation processing module, a synthesis module, a reception environment detector, and an operation module. The replica code generating module generates first and second replica codes with subcarriers different from each other based on code control information from the operation module. The correlation processing module has a first correlator and a second correlator, and the first correlator performs correlation processing of the received positioning signal with the first replica code. The second correlator performs correlation processing of the received positioning signal with the second replica code. The synthesis module synthesizes the first correlation processing result with the second correlation processing result at a predetermined synthesizing ratio. The reception environment detector detects a reception environment of the positioning signal. The operation module calculates the synthesizing ratio based on the reception environment and outputs the code control information based on the synthesized correlation processing result.

Further, this invention relates to a GNSS receiver for receiving and code tracking a positioning signal that is phase modulated by a spreading code. The GNSS receiver includes a replica code generating module, a synthesis module, a correlation processing module, a reception environment detector, and an operation module. The replica code generating module generates first and second replica codes with subcarriers different from each other based on code control information from the operation module. The synthesis module synthesizes the first and second replica codes at a predetermined synthesizing ratio. The correlation processing module performs correlation processing of the received positioning signal with the synthesized replica code. The reception environment detector detects a reception environment of the positioning signal. The operation module calculates the synthesizing ratio based on the reception environment and outputs the code control information based on the correlation processing result of the synthesized replica code.

Here, specifically, the replica code generating module may generate a BOC(1, 1) replica code as the first replica code in which the subcarrier is a BOC(1, 1) subcarrier, and generates a BOC(6, 1) replica code as the second replica code in which the subcarrier is a BOC(6, 1) subcarrier.

With these configurations, the synthesizing ratio of the subcarriers in the replica code is set according to the reception environment. Here, as described above, according to the synthesizing ratio of the subcarriers, a statistical significance exists in a change of a correlation level due to a change of a multipath property and a C/No, by performing the correlation processing while changing the synthesizing ratio of the subcarriers according to the detected reception environment, an appropriate correlation level can be obtained according to the reception environment at the time as well as a correlation result improved in multipath tolerance and pseudo range accuracy can be obtained.

Further, the reception environment detection module of the GNSS receiver of this invention may detect the reception environment by the following methods. Firstly, the reception environment detection module may detect the reception environment by a C/No based on the correlation result. Further, the reception environment detection module may detect the reception environment based on map data indicating an inputted situation around the GNSS receiver.

With these configurations, the reception environment can be detected by various methods, and a suitable synthesizing ratio according to this reception environment can be given.

Further, the GNSS receiver may receive, as the positioning signal, a signal having a plurality of individual channel signals that are phase modulated by a plurality of spreading codes with the same PN code and subcarrier and different synthesis contents, respectively. The correlation processing module of the GNSS receiver may perform correlation processing for every individual channel. An integration processing module may integration process the correlation processing results of the plurality of individual channels. The operation module may output code control information based on the integration processed correlation processing result.

With this configuration, when the positioning signal is constituted with the plurality of individual channel signals, the correlation processing in which the synthesizing ratio of the subcarriers is set according to the reception environment as above is performed for every individual channel Then, by integration processing the correlation processing result for every individual channel, a noise component is relatively suppressed. Thereby, a further highly accurate correlation result can be obtained.

Effect of the Invention

According to this invention, in the case of receiving and demodulating the positioning signal using the PN code phased modulated by a plurality of subcarriers, such as a CBOC signal, the multipath tolerance and the pseudorange accuracy are improved while obtaining a suitable correlation value and the highly accurate correlation result can further surely be obtained. Thereby, a highly accurate code tracking and a highly accurate positioning can be achieved.

MODES OF CARRYING OUT THE INVENTION

Figure 3:
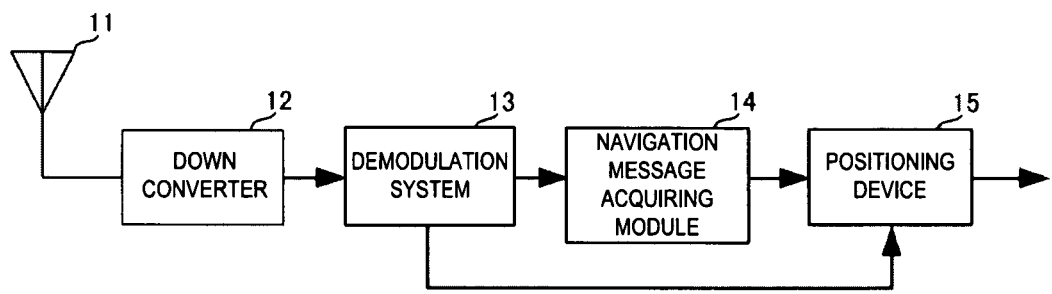
FIG. 3 is a block diagram showing a main configuration of a GNSS receiver according to a first embodiment of the present invention.

A GNSS receiver according to a first embodiment of the present invention is explained with reference to the drawings. Note that, in this embodiment, a GNSS receiver for receiving the above described CBOC signal of the Galileo as a positioning signal is explained as an example; however, as long as it is a reception apparatus of a system for synthesizing a plurality of subcarriers to phase modulate a PN code, it can be applied with a configuration of the present invention. FIG. 3 is a block diagram showing a main configuration of the GNSS receiver of this embodiment.

The GNSS receiver includes a reception antenna 11, a down converter 12, a demodulating system 13, a navigation message acquiring module 14, and a positioning device 15.

The reception antenna 11 receives CBOC signals transmitted from the Galileo satellites, and outputs the CBOC signals that are converted into electric signals to the down converter 12.

The down converter 12 down converts frequencies of the CBOC signals to generate baseband signals and supplies it to the demodulating system 13.

The demodulating system 13 performs acquisition and tracking processing of each of the CBOC signals by performing a carrier correlation and a code correlation on the baseband signal based on the received signal.

The demodulating system 13 first acquires (searches) the CBOC signal to roughly adjust a code phase and a carrier frequency, and then, executes a code tracking. Note that, a detail of code tracking processing is described later.

Then, the demodulating system 13, by using the code phase and the carrier frequency obtained by code tracking loop processing and carrier tracking loop processing, performs demodulation processing on the baseband signal and supplies it to the navigation message acquiring module 14 as well as calculates, for example, a pseudorange based on obtained phase difference information and supplies it to the positioning device 15.

The navigation message acquiring module 14 analyzes a navigation message from the demodulating system 13 and supplies the contents to the positioning device 15. The positioning device 15 performs positioning calculation based on, for example, the contents of the navigation message from the navigation message acquiring module 14, and the pseudorange and carrier frequency information from the demodulating system 13 so as to calculate a position of the positioning apparatus.

Figure 4:
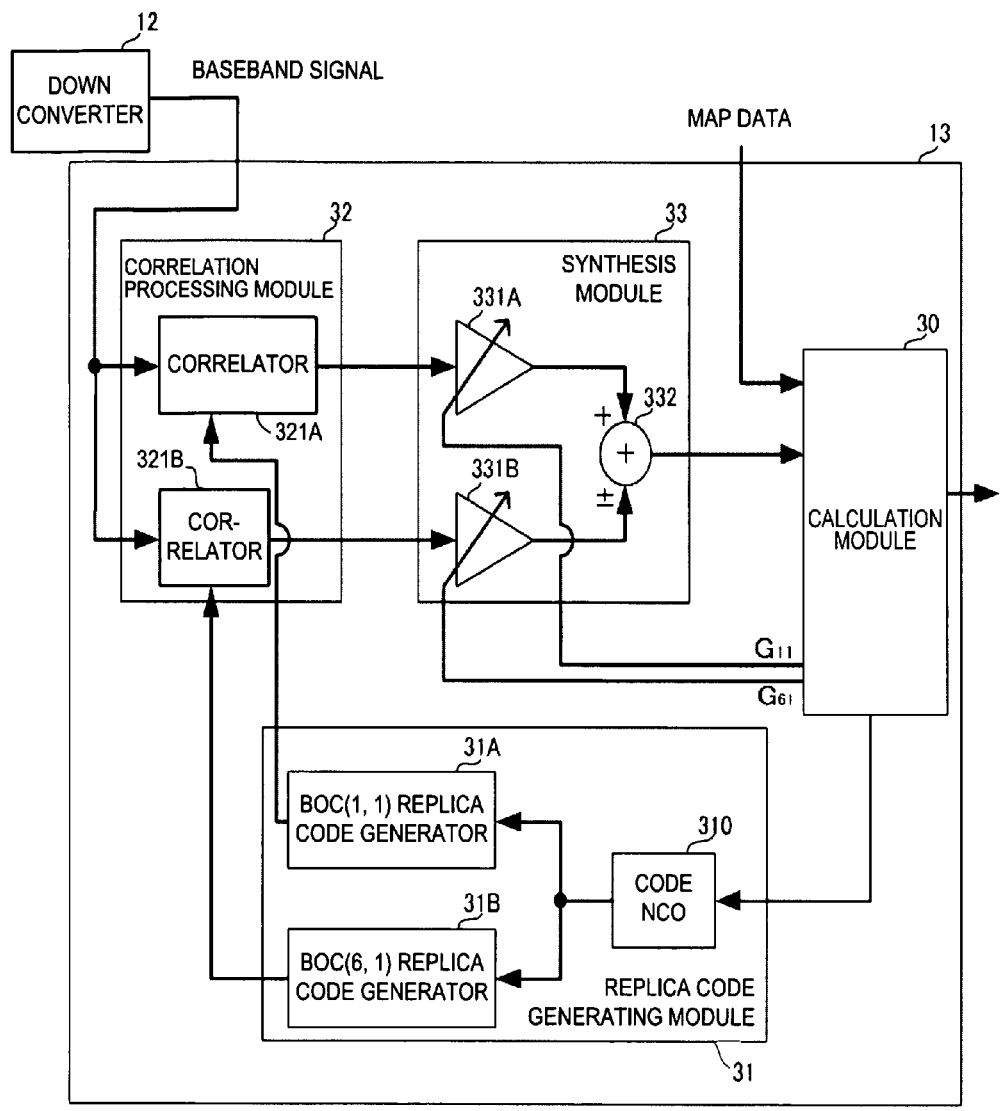
FIG. 4 is a block diagram showing a main configuration of a demodulating system 13 shown in FIG. 3.

The demodulating system 13 serving as a characteristic part of the invention is explained further in detail with reference to FIG. 4.

FIG. 4 is a block diagram showing a main configuration of the demodulating system 13 shown in FIG. 3 with an exclusion of a carrier correlator. Note that, the carrier correlator of the demodulating system 13, which is not illustrated, has a well-known configuration, thereby a description thereof is omitted.

The demodulating system 13 includes a calculation module 30, a replica code generating module 31, a correlation processing module 32, and a synthesis module 33.

The calculation module 30 calculates the code phase based on synthesized correlation data from the synthesis module 33 and calculates the pseudorange based on the code phase, and supplies it to the positioning device 15. Further, the calculation module 30 demodulates the navigation message based on the synthesized correlation data and supplies it to the navigation message acquiring module 14.

Further, the calculation module 30 supplies the code phase as code control information to the replica code generating module 31. Note that, in this embodiment, although the code phase is supplied to the replica code generating module 31 as the code control information, as long as it is used for synchronizing a replica code with a spreading code of the received signal, information such as frequency information may be used other than the code phase.

Moreover, the calculation module 30 also serves as a reception environment detecting module of the present invention, and sequentially measures a C/No (carrier-to-noise-density ratio) based on the synthesized correlation data to detect a reception environment based on the C/No. Note that, the detection of the reception environment is not limited to this and the reception environment may be detected by, for example, acquiring map data around a current position from the outside to acquire a situation of surrounding buildings as shown in FIG. 3, or may be detected based on a correlation result of the baseband signal and a BOC(1, 1) replica code and a correlation result of the baseband signal and a BOC(6, 1) replica code.

The calculation module 30 stores, for every reception environment, a BOC(1, 1) synthesizing ratio coefficient and a BOC(6, 1) synthesizing ratio coefficient that give the synthesizing ratio of the BOC(1, 1) subcarrier and the to BOC(6, 1) subcarrier of each replica code. Here, the BOC(1, 1) synthesizing ratio coefficient and the BOC(6, 1) synthesizing ratio coefficient are set so that the synthesizing ratio of the BOC(6, 1) subcarrier becomes high when the reception environment is good, and the BOC(1, 1) subcarrier becomes high when the reception environment is poor. For example, when the reception environment is good, it is set as "BOC(1, 1):BOC(6, 1)=1:1", and when the reception environment is poor, it is set as "BOC(1, 1):BOC(6, 1)=5:1."

Figure 1:
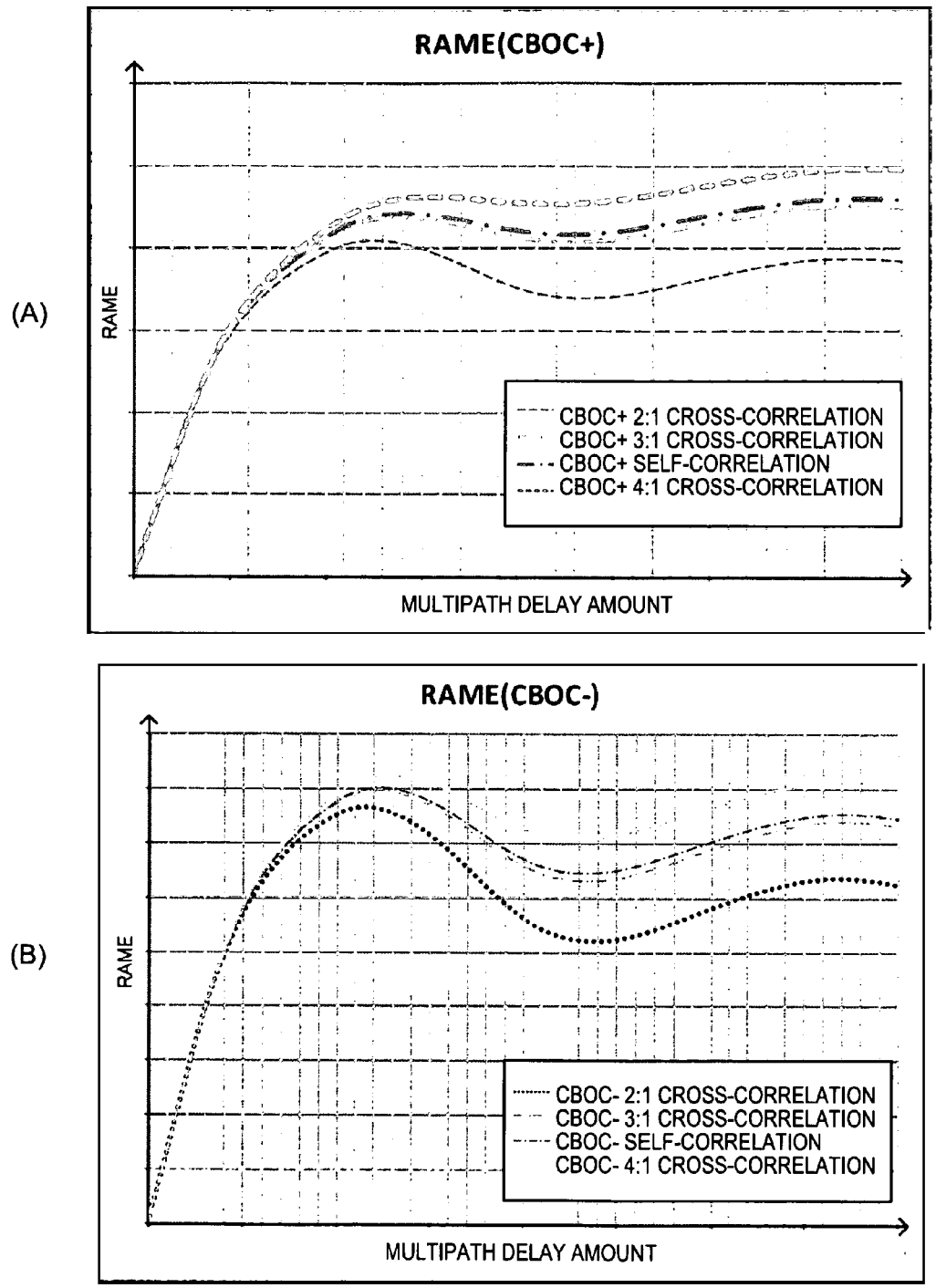
FIG. 1 is charts showing an evaluation result RAME of a multipath property corresponding to a synthesizing ratio of a BOC(1, 1) subcarrier and a BOC(6, 1) subcarrier in a replica code.
Figure 2:
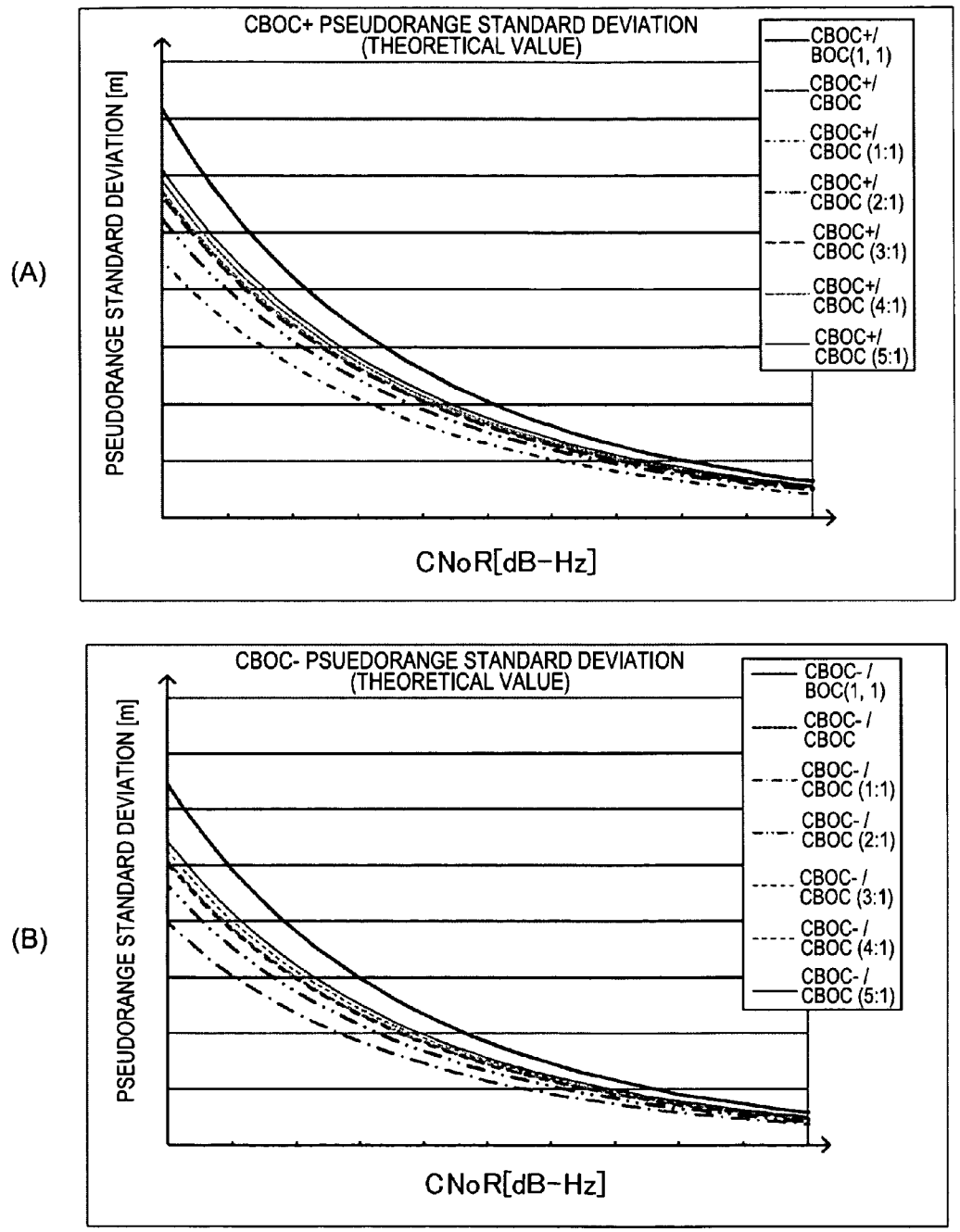
FIG. 2 is charts showing a change of a pseudorange standard deviation corresponding to the synthesizing ratio of the BOC(1, 1) subcarrier and the BOC(6, 1) subcarrier in the replica code and a C/No.

This is based on that, (A) the pseudorange error does not dramatically change corresponding to the synthesizing ratio as shown in FIG. 2, (B) when the reception environment is good, that is the C/No is high as described above, the sufficient code tracking is possible to start with, and a slight degradation of a correlation level due to the synthesizing ratio of the BOC(6, 1) subcarrier being high hardly causes an effect on the code tracking, and (C), as shown in FIG. 1, the multipath property is improved by increasing the synthesizing ratio of the BOC(6, 1) subcarrier.

It is based on that, on the other hand, (D) when the reception environment is poor, that is the C/No is low, there is a possibility that the code tracking itself cannot be performed, and the correlation level needs to be increased.

Note that, instead of such setting of the synthesizing ratio coefficients to be simply divided into the two stages: the cases where the reception environment is good and poor (the cases where the C/No is high and low), it may further specifically be set in a plurality of stages (three stages or more) of the reception environment (for every C/No). For example, in addition to the above described "BOC(1, 1):BOC(6, 1)=1:1" and "BOC(1, 1):BOC(6, 1)=5:1", "BOC(1, 1):BOC(6, 1)=2:1" and "BOC(1, 1):BOC(6, 1)=$10^{(1/2)}$:1" which corresponds to the use, may be used.

Here, setting the replica code to be generated only from either one of the BOC(6, 1) subcarrier and the BOC(1, 1) subcarrier, that is either one of the BOC(6, 1) replica code and the BOC(1, 1) replica code, is preferred not to be performed. This is because, compared to the case where the BOC(6, 1) replica code and the BOC(1, 1) replica code are used individually, the replica code in which the BOC(6, 1) subcarrier and the BOC(1, 1) subcarrier are substantially synthesized tends to have better multipath property and correlation level property in any of the sets of the synthesizing ratio coefficients.

Based on the detected reception environment, the calculation module 30 reads out the BOC(1, 1) synthesizing ratio coefficient and the BOC(6, 1) synthesizing ratio coefficient. The calculation module 30 supplies the BOC(1, 1) synthesizing ratio coefficient $G_{11}$ to a variable amplifier 331A of the synthesis module 33, and the BOC(6, 1) combining ratio coefficient $G_{61}$ to a variable amplifier 331B of the synthesis module 33.

The replica code generating module 31 includes a code NCO 310, a BOC(1, 1) replica code generator 31A, and a BOC(6, 1) replica code generator 31B. The code NCO 310 generates code phase adjusting data for synchronizing the BOC(1, 1) replica code, which is generated by the BOC(1, 1) replica code generator 31A, and the BOC(6, 1) replica code, which is generated by the BOC(6, 1) replica code generator 31B, with the baseband signal. The BOC(1, 1) replica code generator 31A generates the BOC(1, 1) replica code constituted with the PN code and the BOC(1, 1) subcarrier based on the code phase adjusting data, and supplies it to a correlator 321A of the correlation processing module 32. The BOC(6, 1) replica code generator 31B generates the BOC(6, 1) replica code constituted with the PN code and the BOC(6, 1) subcarrier based on the code phase adjusting data, and supplies it to a correlator 321B of the correlation processing module 32.

The correlation processing module 32 includes the correlator 321A corresponding to the first correlator of the present invention and the correlator 321B corresponding to the second correlator of the present invention.

Here, the correlation processing module 32 and the synthesis module 33 are only illustrated as one each in FIG. 4. However, actually, the demodulating system 13 includes a component for generating a Prompt replica code, an Early replica code, and a Late replica code by, for example, a shift register with respect to the replica code generated by the replica code generating module 31, and performing correlation processing and combining processing to these Prompt replica code, Early replica code, and Late replica code.

The correlator 321A multiplication processes the baseband signal with BOC(1, 1) replica code to detect a BOC(1, 1) correlation level. The correlator 321A adds the BOC(1, 1) correlation level over a predetermined time length, thereby, generates BOC(1, 1) correlation data for every predetermined sampling timing, and outputs it to the variable amplifier 331A of the synthesis module 33.

The correlator 321B multiplication processes on the baseband signal and the BOC(6, 1) replica code to detect a BOC(6, 1) correlation level. The correlator 321B adds the BOC(6, 1) correlation level over a predetermined time length, thereby, generates BOC(6, 1) correlation data for every predetermined sampling timing, and outputs it to the variable amplifier 331B of the synthesis module 33.

The synthesis module 33 includes the variable amplifiers 331A and 331B, and an adder 332.

The variable amplifier 331A multiplies the BOC(1, 1) correlation data by the BOC(1, 1) synthesizing ratio coefficient $G_{11}$, which is set by the calculator 30, and outputs it to the adder 332. The variable amplifier 331B multiplies the BOC(6, 1) correlation data by the BOC(6, 1) synthesizing ratio coefficient $G_{61}$, which is set by the calculator 30, and outputs it to the adder 332. The adder 332 performs either one of addition and subtraction between the BOC(1, 1) correlation data, which is multiplied by the BOC(1, 1) synthesizing ratio coefficient $G_{11}$, and the BOC(6, 1) correlation data, which is multiplied by the BOC(6, 1) synthesizing ratio coefficient $G_{61}$, and, thereby, generates the synthesized correlation data, and outputs it to the calculator 30. Note that, the adding processing is performed for the case of the CBOC+ signal, and the subtraction processing is performed for the case of the CBOC− signal.

By utilizing the above configuration, the correlation processing can be performed while suitably changing the synthesizing ratio of the BOC(1, 1) subcarrier and the BOC(6, 1) subcarrier according to the reception environment, therefore, optimal correlation processing can be achieved according to the reception environment at the time based on the multipath property and the correlation level. Thereby, a surely and highly accurate code tracking becomes possible while a highly accurate positioning can be achieved as well.

Note that, the above described synthesis module 33 and the calculator 30 can be achieved by a CPU (central processing unit) and a processing program that is executed by the CPU. As above, by achieving the synthesis module 33 and the calculation module 30 by software processing performed by a single CPU, as with the use of the CBOC signal described above, even the synthesizing ratio such as $10^{(1/2)}:1$, in which not only integers are used, can easily be achieved. Thereby, a variation of the settable synthesizing ratio increases and the correlation processing can be performed with an optimal synthesizing ratio.

Further, in the above explanation, the case where the reception environment is detected to fix the synthesizing ratio is described as an example; however, as described in the following, the synthesizing ratio may be changed according to the reception environment. For example, in the early stage of the multipath detection operation, the correlation processing of the baseband signal and the CBOC replica code is performed and, when the C/No is above a predetermined value and there is a possibility that a multipath exists, the ratio of the BOC(6, 1) subcarrier is increased. Alternatively, in the early stage of the multipath detection operation, the correlation processing is performed at a synthesizing ratio where the effect of the multipath is small and, when the C/No is below a predetermined value and there is a high possibility that the multipath does not exist, the ratio of the BOC(6, 1) subcarrier is set to approach the synthesizing ratio of the CBOC replica code.

Figure 5:
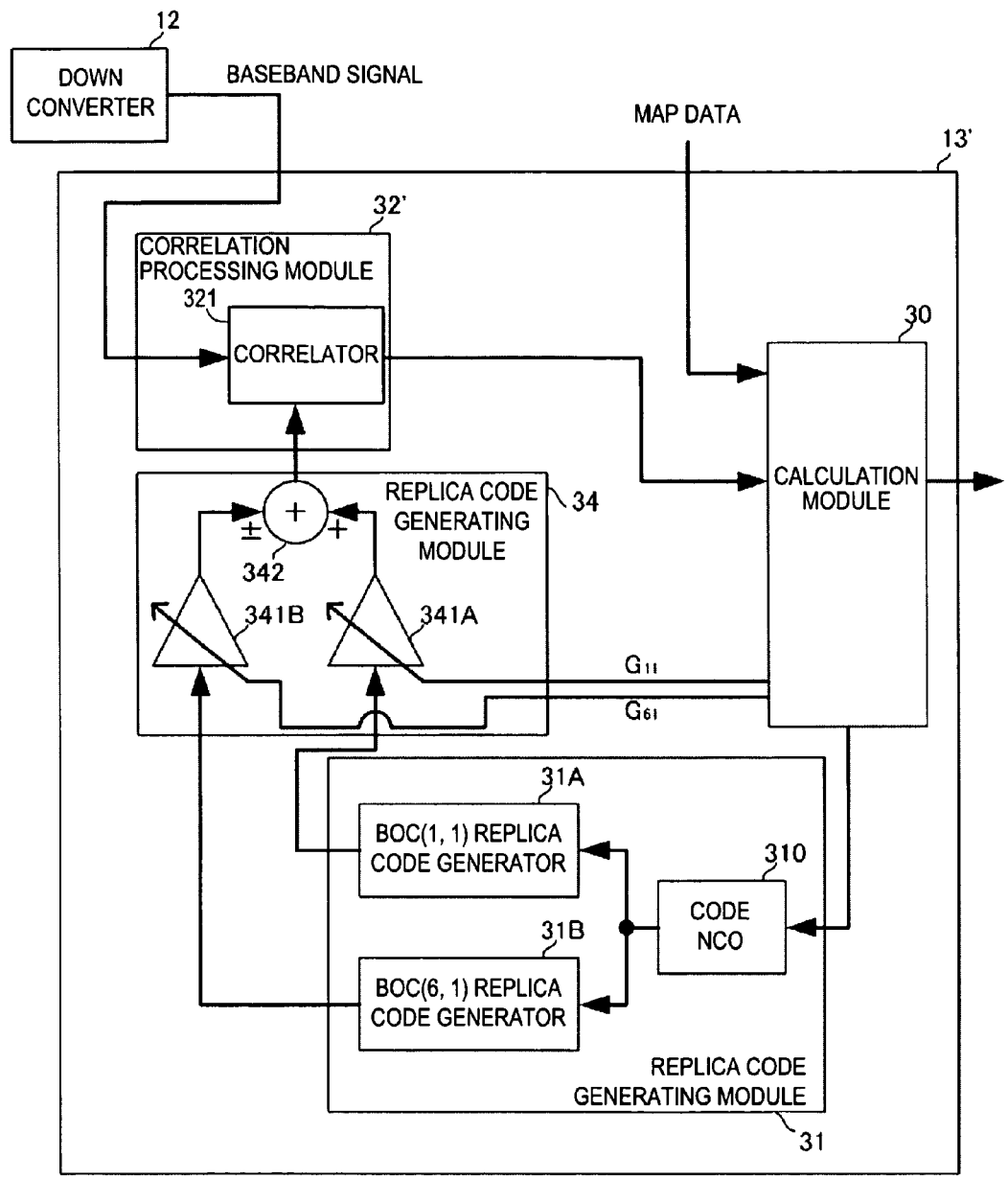
FIG. 5 is a block diagram showing a main configuration of a demodulating system 13' of a second embodiment.

Next, a GNSS receiver according to a second embodiment is explanation with reference to FIG. 5. Note that, because, in the GNSS receiver of this embodiment, only an internal configuration of a demodulating system 13' is different from the demodulating system 13 of the first embodiment and the other configurations are the same, only the demodulating system 13' is explained.

FIG. 5 is a block diagram showing a main configuration of the demodulating system 13' of this embodiment.

As shown in FIG. 5, the demodulating system of this embodiment is not for synthesizing results of correlation processings of the BOC(1, 1) replica code and the BOC(6, 1) replica code with respect to the baseband signal as in the first embodiment, but for generating, as a replica code to be supplied to a correlation processing module 32', a synthesized replica code of the BOC(1, 1) replica code and the BOC(6, 1) replica code, that is a replica code constituted with the BOC (1, 1) subcarrier and the BOC(6, 1) subcarrier. Therefore, the demodulating system 13' of this embodiment has the same configurations and performs the same basic processings as the calculation module 30 and the replica code generating module 31, the explanation thereof is omitted except for a part that newly requires an explanation.

A replica code synthesis module 34 of the demodulating system of this embodiment includes variable amplifiers 341A and 341B, and an adder 342.

The variable amplifier 341A is supplied with the BOC(1, 1) synthesizing ratio coefficient $G_{11}$ from the calculation module 30, and the variable amplifier 341A multiplies the BOC(1, 1) replica code by the BOC(1, 1) synthesizing ratio coefficient $G_{11}$ and outputs it to the adder 342.

The BOC(6, 1) synthesizing ratio coefficient $G_{61}$ is supplied from the calculation module 30 to the variable amplifier 341B, and the variable amplifier 341B multiplies the BOC(6, 1) replica code by the BOC(6, 1) synthesizing ratio coefficient $G_{61}$ and outputs it to the adder 342.

The adder 342 performs either one of addition and subtraction between the BOC(1, 1) replica code and the BOC(6, 1) replica code multiplied by the respective synthesizing ratio coefficient thereof so as to generate the synthesized replica code and output it to a correlator 321 of a correlation processing module 32'.

The correlation processing module 32' includes a correlator 321. The correlator 321 multiplication processes the baseband signal with the synthesized replica code to detect a synthesized correlation level. The correlator 321 adds the synthesized correlation level over a predetermined time length, thereby, generates synthesized correlation data for every predetermined sampling timing, and outputs it to the calculation module 30. Based on this synthesized correlation data, the calculation module 30 calculates each of the synthesizing ratio coefficients $G_{11}$ and $G_{61}$, and code control information.

Even with such a configuration and processing, similar to the first embodiment described above, optimal correlation processing according to the reception environment at the time can be achieved.

Next, a GNSS receiver according to a third embodiment is explained with reference to FIG. 6. Note that, because, also in the GNSS receiver of this embodiment, only an internal configuration of a demodulating system 13" is different from the demodulating system 13 of the first embodiment and the other configurations are the same, only the demodulating system 13' is explained.

Figure 6:
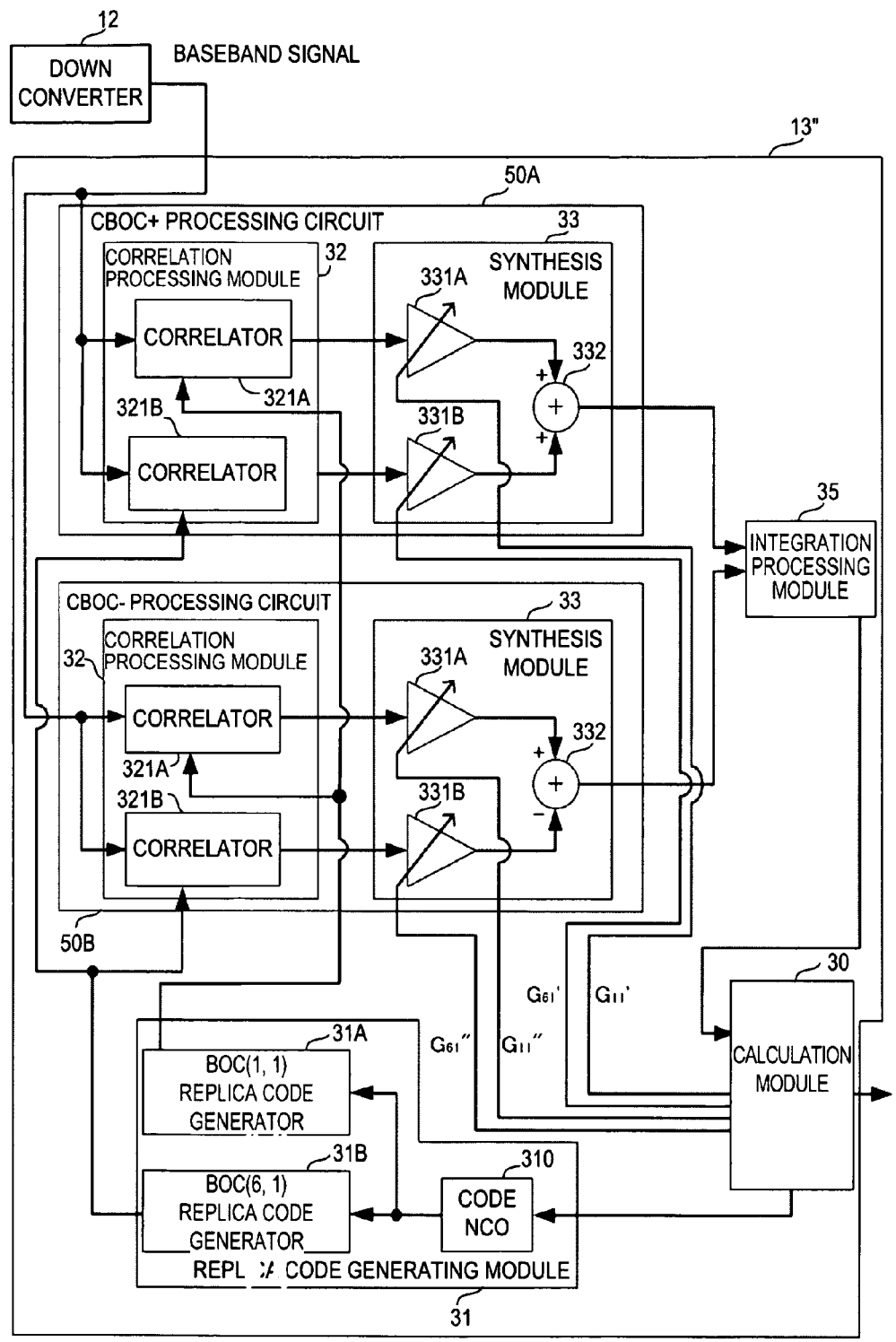
FIG. 6 is a block diagram showing a main configuration of a modulating system 13" of a third embodiment.

FIG. 6 is a block diagram showing a main configuration of the demodulating system 13" of this embodiment. Note that, in FIG. 6, although an illustration of a signal line for detecting a reception environment as shown in FIG. 4 is omitted, similar to FIG. 4, the calculation module 30 is inputted with the results of the correlation results of the baseband signal with the BOC(1, 1) replica code and the BOC(6, 1) replica code, and map data.

Although not being described in details in the first and second embodiments, the CBOC signal is, to be exact, combined with the CBOC+ signal (E1B signal) and the CBOC− signal at a power ratio of 1:1 (50% each). Therefore, in this embodiment, a CBOC+ signal processing circuit 50A for performing the correlation processing on the CBOC+ signal and a CBOC− signal processing circuit 50B for performing the correlation processing to the CBOC− signal are equipped in parallel to each other.

These CBOC+ signal processing circuit 50A and CBOC− signal processing circuit 50B are the same as a circuit in which the correlation processing module 32 and the synthesis module 33 described in the first embodiment are combined together. CBOC+ signal synthesizing ratio coefficients $G_{11}'$ and $G_{61}'$ are supplied from the calculation module 30 to the CBOC+ signal processing circuit 50A, and the CBOC+ signal processing circuit 50A calculates CBOC+ synthesized correlation data with respect to the baseband signal based on the CBOC+ signal synthesizing ratio coefficients $G_{11}'$ and $G_{61}'$, and outputs it to an integration processing module 35. Meanwhile, CBOC− signal synthesizing ratio coefficients $G_{11}"$ and $G_{61}"$ are supplied from the calculation module 30 to the CBOC− signal processing circuit 50B, and the CBOC− signal processing circuit 50B calculates CBOC− synthesized correlation data with respect to the baseband signal based on the CBOC− signal synthesizing ratio coefficients $G_{11}"$ and $G_{61}"$, and outputs it to an integration processing module 35. Note that, the CBOC+ synthesized correlation data and the CBOC− synthesized correlation data correspond to the "correlation data for every individual channel signal".

Figure 7:
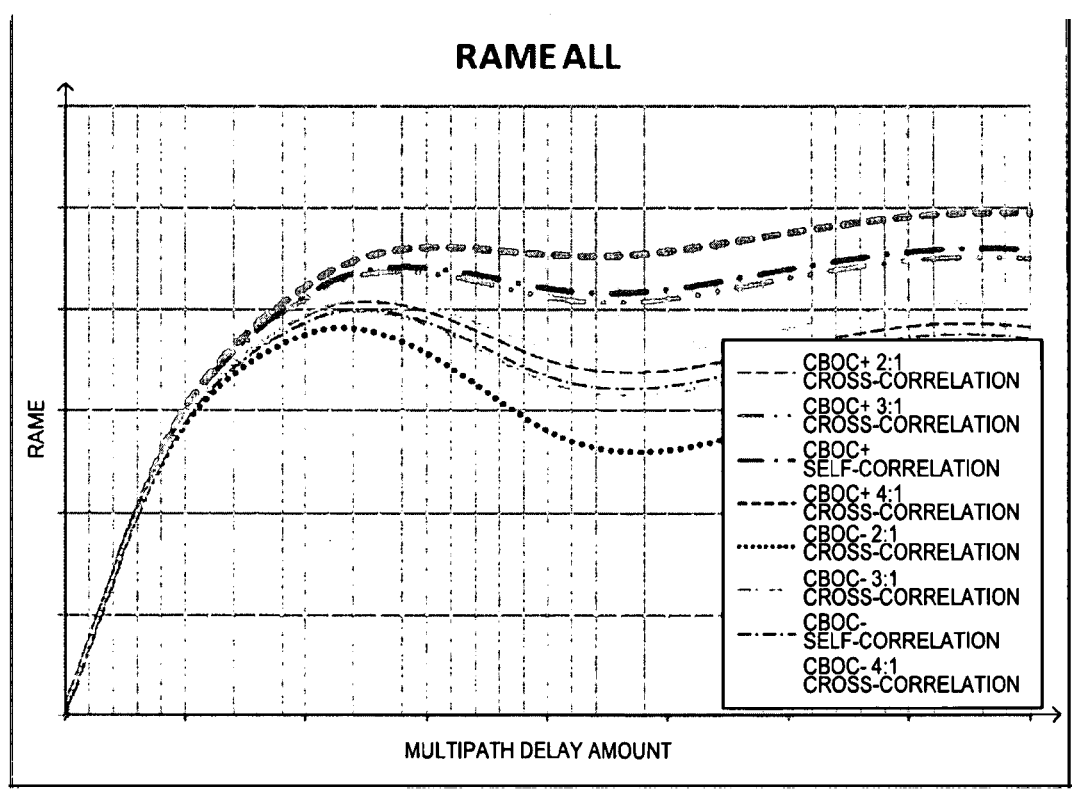
FIG. 7 is a chart showing an evaluation result RAME of multipath properties of a CBOC+ signal and a CBOC− signal corresponding to a synthesizing ratio of a BOC(1, 1) subcarrier and a BOC(6, 1) subcarrier in a replica code.

Here, the CBOC+ signal synthesizing ratio coefficients $G_{11}'$ and $G_{61}'$ and the CBOC− signal synthesizing ratio coefficients $G_{11}"$ and $G_{61}"$ of the BOC(1, 1) replica code and the BOC(6, 1) replica code are suitably set according to the reception environment as described above, and the CBOC+ signal synthesizing ratio coefficients $G_{11}'$ and $G_{61}'$, and the CBOC− signal synthesizing ratio coefficients $G_{11}"$ and $G_{61}"$ may be the same or may be different. This is because between the CBOC+ signal and the CBOC− signal, as shown in FIG. 7 when the synthesizing ratio of the replica code is changed, the multipath property varies and the change in the correlation level for every C/No varies. FIG. 7 is a chart showing an evaluation result RAME of multipath properties of the CBOC+ signal and the CBOC− signal corresponding to the synthesizing ratio of the BOC(1, 1) subcarrier and the BOC (6, 1) subcarrier.

The integration processing module 35 integrates the CBOC+ synthesized correlation data with the CBOC− synthesized correlation data and supplies it to the calculation module 30. Note that, the integration processing is, for example, processing of calculating an average level and an average time of a plurality of synthesized correlation data; however other methods may be utilized. Based on the integration correlation data, the calculation module 30 calculates the code control information, and detects the reception environment to set the CBOC+ signal synthesizing ratio coefficients $G_{11}'$ and $G_{61}'$ and the CBOC− signal synthesizing ratio coefficients $G_{11}"$ and $G_{61}"$.

With such a configuration and by performing such processing, correlation processing which not only the reception environment is taken into consideration as above, but also is optimal to both the CBOC+ signal and the CBOC− signal can be performed. Further, by performing the integration processing, in the integration correlation data, a signal-to-noise ratio (S/N) is improved for the CBOC+ synthesizing correlation data and the CBOC− synthesizing correlation data, therefore, a noise component is relatively suppressed and further highly accurate correlation data can be obtained.

Note that, in this embodiment, the configurations of the first embodiment is used for the correlation processing circuit for the CBOC+ signal and the correlation processing circuit for the CBOC− signal; however, the configurations of the second embodiment may be applied.

Further, in each of the above embodiments, the reception environment is determined based on the C/No; however, by detecting a multipath delay amount, the reception environment may be determined based on the multipath delay amount, or the reception environment may be determined based on both of the C/No and the multipath delay amount. Alternatively, if another reception environment determination element exists, the element may be used.

DESCRIPTION OF NUMERALS

11: Reception Antenna; 12: Down Converter; 13, 13' and 13": Demodulating system; 14: Navigation Message Acquiring Module; 15: Measuring Module; 30: Calculation Module; 31: Replica Code Generator; 31A: BOC(1, 1) Replica Code Generator; 31B: BOC(6, 1) Replica Code Generating Module; 32 and 32': Correlation Processing Module; 321, 321A and 321B: Correlator; 33: Synthesis Module; 331A, 331B, 341A and 341B: Variable Amplifier; 332 and 342: Adder; 34: Replica Code Generating Module; and 35: Integration Processing Module.

What is claimed is:

1. A GNSS receiver for receiving and code tracking a positioning signal that is phase modulated by a spreading code, comprising:

a replica code generating module for generating first and second replica codes with subcarriers different from each other based on code control information from a calculation module;

a correlation processing module having a first correlator for performing correlation processing of the received positioning signal with the first replica code, and a second correlator for performing correlation processing of the received positioning signal with the second replica code;

a synthesis module for synthesizing the first correlation processing result with the second correlation processing result at a predetermined synthesizing ratio;

a reception environment detector for detecting a reception environment of the positioning signal; and the calculation module for calculating the synthesizing ratio based on the reception environment and outputting the code control information based on the synthesized correlation processing result.

2. A GNSS receiver for receiving and code tracking a positioning signal that is phase modulated by a spreading code, comprising:

a replica code generating module for generating first and second replica codes with subcarriers different from each other based on code control information from a calculation module;

a synthesis module for synthesizing the first and second replica codes at a predetermined synthesizing ratio;

a correlation processing module for performing correlation processing of the received positioning signal with the synthesized replica code;

a reception environment detector for detecting a reception environment of the positioning signal; and the calculation module for calculating the synthesizing ratio based on the reception environment and outputting the code control information based on the correlation processing result of the synthesized replica code.

3. The GNSS receiver of claim 1 or 2, wherein the replica code generating module generates a BOC(1, 1) replica code as the first replica code in which the subcarrier is a BOC(1, 1) subcarrier, and generates a BOC(6, 1) replica code as the second replica code in which the subcarrier is a BOC(6, 1) subcarrier.

4. The GNSS receiver of any one of claims 1 and 2, wherein the reception environment detection module detects the reception environment by a C/No based on the correlation result.

5. The GNSS receiver of any one of claims 1 and 2, wherein the reception environment detection module detects the reception environment based on map data indicating an inputted situation around the GNSS receiver.

6. The GNSS receiver of any one of claims 1 and 2, wherein the positioning signal is comprised of a plurality of individual channel signals that are phase modulated by a plurality of spreading codes with the same PN code and subcarrier and different synthesis contents, respectively, wherein the correlation processing module performs correlation processing for every individual channel, wherein an integration processing module integration processes the correlation processing results of the plurality of individual channels, and wherein the calculation module outputs code control information based on the integration processed correlation processing result.

* * * * *